United States Patent
Weber et al.

(10) Patent No.: US 8,626,322 B2
(45) Date of Patent: Jan. 7, 2014

(54) MULTIMEDIA DISPLAY BASED ON AUDIO AND VISUAL COMPLEXITY

(75) Inventors: Ralf Weber, Cupertino, CA (US); Guillaume Vergnaud, Tokyo (JP)

(73) Assignee: Apple Inc., Cupertino, CA (US)

( * ) Notice: Subject to any disclaimer, the term of this patent is extended or adjusted under 35 U.S.C. 154(b) by 944 days.

(21) Appl. No.: 12/497,534

(22) Filed: Jul. 2, 2009

(65) Prior Publication Data

US 2010/0168881 A1    Jul. 1, 2010

Related U.S. Application Data

(60) Provisional application No. 61/193,852, filed on Dec. 30, 2008.

(51) Int. Cl.
*G06F 17/00* (2006.01)

(52) U.S. Cl.
USPC ............ 700/94; 381/61; 381/62; 381/63; 381/98; 381/99; 381/100; 381/101; 381/102; 381/103; 381/104; 381/105; 381/106; 381/107; 381/108; 381/109; 715/716; 715/717; 715/719; 715/720; 715/721; 715/722; 715/723; 715/724; 715/725; 715/726; 715/727; 715/730; 715/731

(58) Field of Classification Search
USPC ............................................... 700/94
See application file for complete search history.

(56) References Cited

U.S. PATENT DOCUMENTS

| | | | |
|---|---|---|---|
| 5,521,841 A | 5/1996 | Arman et al. | |
| 5,752,029 A | 5/1998 | Wissner | |
| 5,758,093 A | 5/1998 | Boezeman et al. | |
| 5,760,767 A | 6/1998 | Shore et al. | |
| 5,841,438 A | 11/1998 | Cave | |
| 5,852,435 A | 12/1998 | Vigneaux et al. | |
| 6,031,529 A | 2/2000 | Migos et al. | |
| 6,067,126 A * | 5/2000 | Alexander | 348/738 |
| 6,204,840 B1 | 3/2001 | Petelycky et al. | |
| 6,320,598 B2 * | 11/2001 | Davis et al. | 345/648 |
| 6,332,147 B1 | 12/2001 | Moran et al. | |
| 6,369,835 B1 | 4/2002 | Lin | |
| 6,463,444 B1 | 10/2002 | Jain et al. | |
| 6,580,438 B1 | 6/2003 | Ichimura et al. | |
| RE38,401 E | 1/2004 | Goldberg et al. | |
| 6,744,974 B2 | 6/2004 | Neuman | 386/96 |
| RE38,609 E | 10/2004 | Chen et al. | |
| 6,807,361 B1 | 10/2004 | Girgensohn et al. | |
| 6,928,613 B1 | 8/2005 | Ishii et al. | |
| 7,030,872 B2 | 4/2006 | Tazaki | |
| 7,082,572 B2 | 7/2006 | Pea et al. | |

(Continued)

OTHER PUBLICATIONS

"U.S. Appl. No. 12/497,462, Final Office Action mailed Jun. 12, 2012", 10 pgs.

(Continued)

*Primary Examiner* — Paul McCord
(74) *Attorney, Agent, or Firm* — Schwegman Lundberg & Woessner, P.A.

(57) ABSTRACT

A computer-implemented method and system are provided for profiling or analyzing audio data based on an audio parameter. The audio data is divided into audio data into segments. Each segment is characterized by the audio parameter in a defined range. Effects are selected according to the segments meeting criteria for the audio parameter of the effects. A media presentation is authored or generated using the selected effects.

18 Claims, 12 Drawing Sheets

(56) References Cited

U.S. PATENT DOCUMENTS

| | | |
|---|---|---|
| 7,085,995 B2 | 8/2006 | Fukuda et al. |
| 7,143,362 B2 | 11/2006 | Dieberger et al. |
| 7,149,974 B2 | 12/2006 | Girgensohn et al. |
| 7,213,051 B2 | 5/2007 | Zhu |
| 7,352,952 B2 | 4/2008 | Herberger et al. |
| 7,469,054 B2 | 12/2008 | Aratani et al. |
| 7,512,886 B1* | 3/2009 | Herberger et al. ............ 715/723 |
| 7,528,315 B2* | 5/2009 | Goodwin ........................ 84/611 |
| 7,669,132 B2 | 2/2010 | Widdowson |
| 7,890,867 B1 | 2/2011 | Margulis |
| 7,979,801 B2 | 7/2011 | Krishnaswamy et al. |
| 2002/0143961 A1* | 10/2002 | Siegel et al. .................. 709/229 |
| 2002/0154140 A1 | 10/2002 | Tazaki |
| 2002/0154158 A1 | 10/2002 | Fukuda et al. |
| 2003/0090506 A1 | 5/2003 | Moore et al. |
| 2003/0091204 A1* | 5/2003 | Gibson ......................... 381/119 |
| 2003/0184598 A1 | 10/2003 | Graham |
| 2003/0189588 A1 | 10/2003 | Girgensohn et al. |
| 2004/0027369 A1* | 2/2004 | Kellock et al. ................ 345/716 |
| 2004/0255307 A1* | 12/2004 | Irudayaraj .................... 719/328 |
| 2005/0084232 A1 | 4/2005 | Herberger et al. |
| 2005/0275805 A1 | 12/2005 | Lin et al. |
| 2006/0075348 A1 | 4/2006 | Xu et al. |
| 2006/0152678 A1 | 7/2006 | Hung et al. |
| 2007/0006073 A1 | 1/2007 | Gerhard et al. |
| 2007/0146388 A1 | 6/2007 | Langmacher et al. |
| 2007/0163427 A1* | 7/2007 | Rigopulos et al. ............ 84/609 |
| 2007/0180979 A1* | 8/2007 | Rosenberg ..................... 84/611 |
| 2008/0077710 A1* | 3/2008 | Kouvelas et al. ............. 709/250 |
| 2008/0079690 A1* | 4/2008 | Foxenland .................... 345/156 |
| 2008/0098032 A1 | 4/2008 | Wu et al. |
| 2008/0162228 A1 | 7/2008 | Mechbach et al. |
| 2008/0183751 A1* | 7/2008 | Cazier et al. ............... 707/104.1 |
| 2008/0215979 A1 | 9/2008 | Clifton et al. |
| 2009/0187826 A1 | 7/2009 | Heimbold et al. |
| 2010/0085379 A1* | 4/2010 | Hishikawa et al. ........... 345/619 |
| 2010/0169777 A1 | 7/2010 | Weber et al. |
| 2010/0169784 A1 | 7/2010 | Weber et al. |

OTHER PUBLICATIONS

"U.S. Appl. No. 12/497,462, Non Final Office Action mailed Feb. 15, 2013", 10 pgs.

"U.S. Appl. No. 12/497,462, Non Final Office Action mailed Dec. 28, 2011", 10 pgs.

"U.S. Appl. No. 12/497,462, Response filed Mar. 22, 2012 to Non Final Office Action mailed Dec. 28, 2011", 11 pgs.

"U.S. Appl. No. 12/497,462, Response filed Nov. 13, 2012 to Final Office Action mailed Jun. 12, 2012", 8 pgs.

"U.S. Appl. No. 12/497,541, Final Office Action mailed Jun. 13, 2012", 11 pgs.

"U.S. Appl. No. 12/497,541, Non Final Office Action mailed Jan. 23, 2013", 13 pgs.

"U.S. Appl. No. 12/497,541, Non Final Office Action mailed Dec. 28, 2011", 11 pgs.

"U.S. Appl. No. 12/497,541, Response filed Mar. 22, 2012 to Non Final Office Action mailed Dec. 28, 2011", 13 pgs.

"U.S. Appl. No. 12/497,541, Response filed Oct. 15, 2012 to Final Office Action mailed Jun. 13, 2012", 10 pgs.

"U.S. Appl. No. 12/499,794, Non Final Office Action mailed Oct. 25, 2012", 12 pgs.

"U.S. Appl. No. 12/499,794, Response filed Mar. 22, 2013", 9 pgs.

* cited by examiner

MULTIMEDIA DISPLAY BASED ON AUDIO AND VISUAL COMPLEXITY

This application claims the benefit and priority of the U.S. Provisional Patent Application No. 61/193,852 filed on Dec. 30, 2008, which is hereby incorporated by reference.

FIELD OF INVENTION

The present invention relates generally to the field of authoring media presentations and, in particular, to authoring media presentations using profiled audio data.

BACKGROUND OF INVENTION

Current media presentation applications offer features for creating slides and manually customizing the ways in which a set of slides, i.e., a slideshow, is played. Such applications also offer features for attaching themes to slideshows, where such themes may affect the appearance and general behavior of the slideshows when played. In addition, such applications further offer features such as customizing slide colors, customizing transition behavior, customizing transition delay, and manually adding clip art/image/audio/video files to one or more slides in a slideshow. These applications also permit basic sequential transition, forward or backward, from one slide to another in a slideshow containing more than one slide. A user may customize the time that one slide should be viewed prior to the application invoking a transition to another slide, which may further have a custom viewing time associated with it, as well.

However, current media presentation applications do not dynamically profile audio data, such as a slideshow soundtrack, based on various audio parameters, including beats per minute, rhythmic strength, harmonic complexity, and/or square root of the arithmetic mean of the square of density variations (RMS) strength. In addition, current media presentation applications do not utilize the profiled audio data to select appropriate effects, transitions, or filters and assemble them in useful ways to author a media presentation. Current media presentation applications also do not set effect durations, in/out points, and transitions in-sync with audio alone or the audio of a video.

Moreover, current media presentations applications do not author media presentations by defining a layer, where the layer comprises one or more effects, associating media content with the layer, aggregating the layer with one or more other layers, and assembling the aggregated layers.

Finally, current media presentation applications do not provide automatic, as well as user-defined, authoring, rendering, exporting, and sharing media presentations/slideshows in an easily integrated platform.

SUMMARY OF THE INVENTION

Accordingly, the present invention is directed to a system and method for authoring media presentations that substantially obviates one or more problems due to limitations and disadvantages of the related art.

An object of the present invention is to provide systems and methods for profiling audio data based on various audio parameters.

Another object of the present invention is to provide systems and methods for profiling audio data based on beats per minute, rhythmic strength, harmonic complexity, and/or square root of the arithmetic mean of the square of density variations (RMS) strength.

Another object of the present invention is to provide systems and methods for automatically authoring a media presentation using the profiled audio data.

Another object of the present invention is to provide systems and methods for selecting effects, transitions, or filters and assembling them in useful ways to author a media presentation.

Yet another object of the present invention is provide systems and methods to adjust effect durations, in and out points, and transitions to be in-sync with audio alone or the audio of a video.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method comprises analyzing audio data based on an audio parameter, dividing the audio data into segments, wherein each segment is characterized by the audio parameter in a defined range, selecting effects according to the segments meeting criteria for the audio parameter of the effects, and generating a media presentation using the selected effects.

In another aspect, a system comprises memory configured to store audio data and one or more processors configured to analyze the audio data based on an audio parameter, divide the audio data into segments, wherein each segment is characterized by the audio parameter in a defined range, select effects according to the segments meeting criteria for the audio parameter of the effects, and generate a media presentation using the selected effects.

In another aspect, a computer-readable storage medium stores one or more programs configured for execution by a computer, the one or more programs comprising instructions to analyze audio data based on an audio parameter, divide the audio data into segments, wherein each segment is characterized by the audio parameter in a defined range, select effects according to the segments meeting criteria for the audio parameter of the effects, and generate a media presentation using the selected effects.

In another aspect, a computer-implemented method comprises analyzing audio data based on an audio parameter, dividing the audio data into segments, wherein each segment is characterized by the audio parameter in a defined range, linking an audio requirements profile of each of one or more effects to an audio parameter, adjusting the one or more effects based on the audio parameter, generating a media presentation using the adjusted one or more effects.

In another aspect, a system comprises memory configured to store audio data and one or more processors configured to analyze audio data based on an audio parameter, divide the audio data into segments, wherein each segment is characterized by the audio parameter in a defined range, link an audio requirements profile of each of one or more effects to an audio parameter, adjust the one or more effects based on the audio parameter, and generate a media presentation using the adjusted one or more effects.

In yet another aspect, a computer-readable storage medium stores one or more programs configured for execution by a computer, the one or more programs comprising instructions to analyze audio data based on an audio parameter, divide the audio data into segments, wherein each segment is characterized by the audio parameter in a defined range, link an audio requirements profile of each of one or more effects to an audio parameter, adjust the one or more effects based on the audio parameter, and generate a slideshow/media presentation using the adjusted one or more effects.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
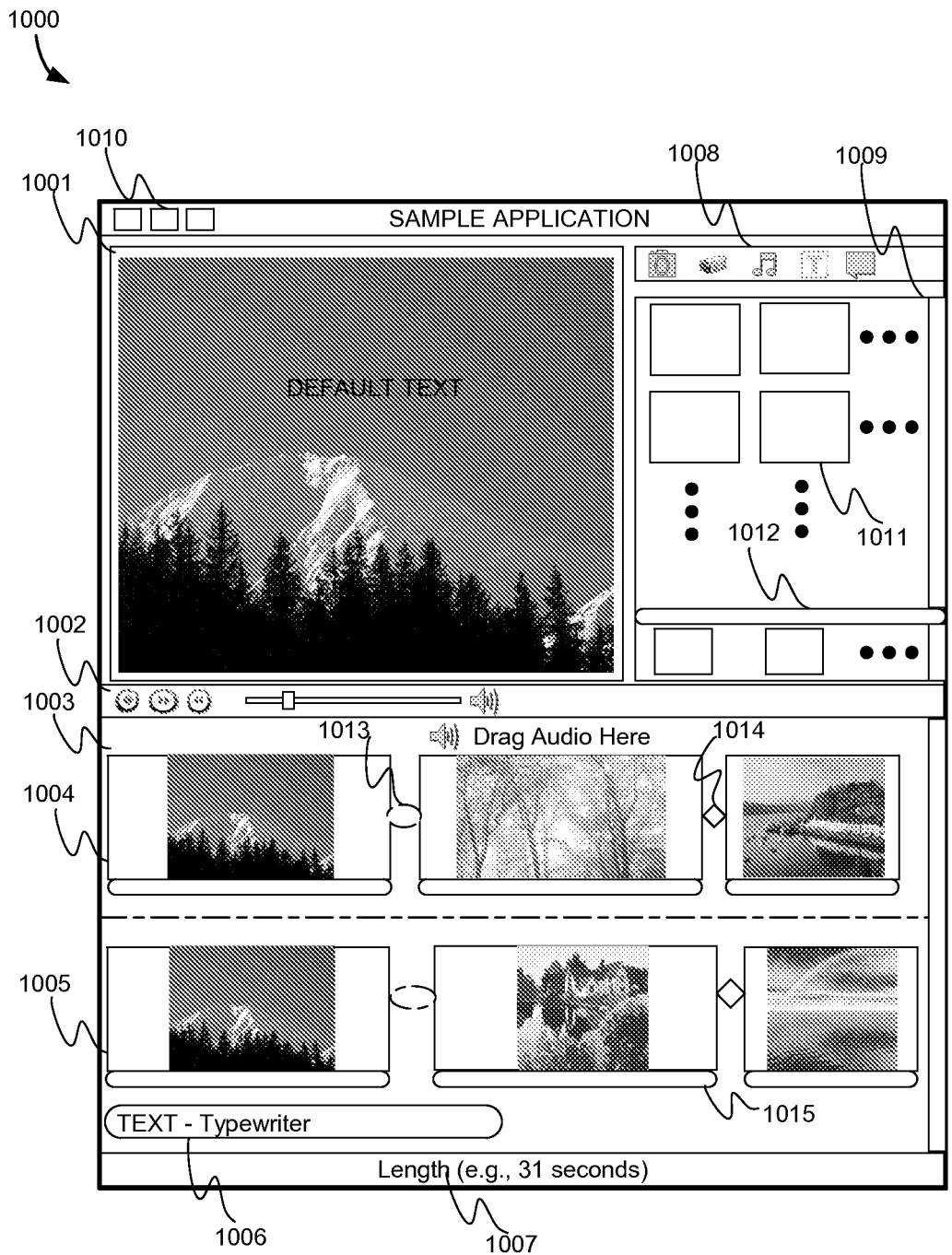
FIG. 1 illustrates an exemplary embodiment of an application in accordance with the present invention.

FIG. 1 illustrates an exemplary embodiment of an application in accordance with the present invention. The exemplary embodiment of an application 1000 comprises a document 1001, a set of controls 1002 for controlling/manipulating the document 1001, an edit layers and effect containers region 1003 (e.g., steps 6001, 7001), a background layer 1004 with effect containers and effects associated with the effect containers, a foreground layer 1005 with effect containers and effects associated with the effect containers, a text typewriter 1006 for associating text with one or more effect containers/effects/slides, a document length 1007 indicator, a select media content menu 1008 (e.g., steps 6002, 7002), a main effects library 1009, a documents selection menu 1010 for selecting among available documents, one or more effects 1011 (which may be available according to a filter criteria) within the main effects library 1009, a subset of the main effects library 1012, a gap variable 1013 for separating an effect or effect container (with one or more effects and slides) from the next effect or effect container using a gap, a transition variable 1014 for separating an effect or effect container (with one or more effects and slides) from the next effect or effect container using a transition, and an effect style 1015 (also, name or property). The exemplary embodiment of an application 1000 illustrates a use of the application 1000 to create a document 1001 (e.g., steps 6004, 7004) using a background layer 1004, a foreground layer 1005 (additional background/foreground layers may also be added to the document but may not be illustrated in FIG. 1) (e.g., steps 7008, 7009), customized gaps 1013 and/or transitions 1014 separating effect containers. Effect containers may comprise, for example, one or more effects from, for example, the main effects library 1009 or the subset of the main effects library 1012; and, effects may further comprise one or more slides like, for example, images, movies, audio, text (e.g., a string with font information that may determine how text will look and feel), and other media content (e.g., steps 6002, 7002, 7006, 7012, 7013). Effects may determine how the image and its surroundings will appear on a screen/display during play (e.g., an image may be displayed according to "book theme," where the effect would be the feature/component for determining how the photos may be laid out or organized on-screen; an effect may store/pass information related to how a photo would bounce around on a screen; or, an effect may also store/pass information related to text, where the text may be added or associated with a slide, effect, layer, or document of a slideshow/media presentation). Further, effects may be filtered according to media content type using the select media content menu 1008. For example, images, video, audio, text, and captions may be used to filter effects accordingly. Meaning, the relevant effects associated with each of the foregoing types of media content may be displayed accordingly upon invocation of the respective menu item from the select media content menu 1008. Details regarding effects may be displayed in the effects style 1015 section, which may be positioned beneath each respective effect container, and corresponding to a presently active effect, in the effect containers region 1003.

In some embodiments, the exemplary embodiment of an application 1000, and its features/components, may be implemented by one or more modules/engines (FIG. 3A, reference numerals 3020-23) executed using an exemplary system 4000 (FIG. 4) with a central processing unit (CPU) 4001 (and, alternatively, multiple CPUs), memory 4002 for storing data (e.g., instructions from an operating system 4007 or one or more programs (e.g., 4008, 4009)) to be fetched by the CPU for execution, a display device 4003 for displaying the exemplary application 1000 using a graphics module to a display screen, a network interface card (NIC) 4004 for sending and receiving data over a wired or wireless communications network, local storage 4006 for storing media content and other data (e.g., an operating system 4007, the exemplary embodiment of an application 1000, other applications, etc.), and auxiliary device(s)/component(s) 4005 (e.g., TV (or, other display), portable storage, portable media player, etc.), which may all be connected via a bus for sending and receiving data according to a frequency (e.g., synchronous or asynchronous).

In some embodiments, the features/components of the application 1000 may be described as follows. The document 1001 (also, FIG. 3, reference numeral 3001) is the top level object of the media presentation/slideshow that may be created (e.g., steps 6004, 7004) using the exemplary application 1000. The document is the object that may comprise: all of the custom/default layers 1004, 1005 (also, FIG. 3, reference numeral 3002) (e.g., steps 6003, 7003, 7010), effect containers such as, for example, those within the effect containers region 1003 (also, FIG. 3, reference numeral 3003); effects such as, for example, those within the effect containers (also, FIG. 3, reference numeral 3004); gaps 1013 or transitions 1014 for separating or linking effects, respectively (also, FIG. 3, reference numeral 3012); slides such as, for example, the images of FIG. 1 or other media content as described above (also, FIG. 3, reference numeral 3005, 3010) (e.g., step 6002, 7002); frames 3006; a document/layer/effect stack 3007; a layer/effect/slide/filter stack 3011; a playlist 3008; an animation path 3014; a song 3009; a keyframe 3015 (which may, for example, be one dimensional (1D) 3016, two dimensional (2D) 3017 or a vector (3018)); filters 3019; a layer/effect container/effect/slide/filter stack 3013; and, any other possible combination of the aforementioned. Moreover, a document may contain layers that may be stacked/placed one on top of another to provide the media presentation/slideshow with an added level of flexibility in what is available for actual display (e.g., steps 6003, 7003, 7010). Accordingly, the application supports the presentation of less than all of the available layers. Stacking may involve a process, for example, of logically associating, or linking, layers. That is, a background layer 1004 may be considered the lowest level layer in a stack of layers, followed by a foreground layer 1005 and a plurality of other foreground layers, all of which would be logically associated according to their position from, for example, background layer 1004, or from each other foreground layer. During display/play of a document such as, for example, document 1001, the layers would be displayed/played according to their respective positions in the stack (logical associations). The next feature/component is the layers 1004 (background), 1005 (foreground) (also, FIG. 3, reference numeral 3002) within a document 1001 (also, FIG. 3, reference numeral 3001) (e.g., steps 6001, 7001). Each layer 1004, 1005 of a stack of layers (e.g., aggregated layers; steps 6003, 7003) within a document can be positioned, sized, and rotated using the exemplary application 1000. Further, each layer 1004, 1005 may also have a custom audio file/track (or, alternatively, a set of audio files/tracks, or other media content) associated with it and other layers 1004, 1005, thus, providing a media presentation/slideshow with multiple audio files/tracks during presentation (e.g., steps 6002, 7002). Each layer 1004, 1005 may also contain effect containers (like, for example, those illustrated in the effect containers region 1003) (e.g., steps 6002, 7002), which may be linked together in a layer using transitions 1014 (also, FIG. 3, reference numeral 3012) or separated from one another using gaps 1013 (or, alternatively, some other effect separation variable like, for example, random separation/transition, or a combination of gaps and transitions, etc.) (e.g., 7005). Transitions 1014, which through visual action/expression may create the appearance that two effect containers are linked together, may be able to provide a rather "fluid" (or, alternatively, a "non-fluid") experience between effect containers when presenting a media presentation/slideshow. For example, transitions may be the visual action/expression of a page flipping, a slide dissolving, a slide being pushed along in any direction, a cube breaking apart (or, being assembled), a page rolling for the purpose of unveiling/hiding contents, a puzzle being assembled (or, disassembled), or any other type of visual action/expression applied to an effect container or slide and capable of being rendered on a display device. Slides in the exemplary application may be the actual image, movie, text, or other media content that may be within an effect, which may be within an effect container (e.g., steps 6002, 7002). Slides may have frames applied as an added layer (e.g., on top), where a frame may be a visual element/expression such as, for example, making an image appear as if it was taken using an instant photo camera (e.g., Polaroid®), is part of a filmstrip, has a solid/dashed/shadowed/other border surrounding it, or other type of frame-related visual element/expression. Further, each slide may have an animation path 3014 that may determine which part of a slide image, movie, text, or other media content, is actually displayed/played; similarly, an animation path 3014 associated with the slide may cause a panning/zooming effect to be executed on the image, movie, text, or other media content, where the panning/zooming may occur within the effect of the slide. As applied to a layer, a user may also customize an animation path 3014 via the exemplary application 1000 to, for example, smoothly transition a layer's rotation from around zero (0) degrees all the way to three hundred sixty (360) degrees, over a default or custom period of time (e.g., steps 6002, 7002). In some embodiments, transitions 1014 may have durations associated with them to determine how long the transitions are played. The transition duration may be subtracted directly from the total duration of the effect containers separated/divided by the transition. For example, when transitioning from an effect container with a three (3) second duration to another effect container with a three (3) second duration, that is, having a six (6) second total duration, using a transition with a one (1) second duration, the effect containers may only be played for a total of five (5) seconds (i.e., the total six (6) second duration of the effect containers minus the one (1) second transition display/play duration leaves five (5) seconds of display/play duration for the effect containers).

In some embodiments, effect containers may be able to determine the order that images (or, alternatively, other media content) associated with a layer (e.g., steps 6002, 7002) are presented during a media presentation/slideshow. Such a determination may be based according to characteristics associated with the images (or, alternatively, other media content) (e.g., steps 6004, 7004). The characteristics may comprise a resolution, size, quality indicator, dots-per-inch, frames per second, window size, bit error rate (BER), compression type, or some other media content characteristic. The exemplary application 1000 may execute this process of assembling the layers (e.g., steps 6004, 7004) either manually or according to algorithms processing the characteristics and other layer-related data (described above). Further with respect to effect containers (e.g., a container or group of effects), multiple effects may be transitioned as one set into the next effect container. For example, effect containers are necessary in order for different text to be displayed on top of different effects. In some embodiments, from an implementation viewpoint, the effect containers permit the logical/physical grouping of different effects and link each of the effects to their respective different text, which is to be displayed on top of each respective effect. Each effect container may, for example, further contain a variable for storing a specific duration for determining how long each of the effects associated with an effect container (or, alternatively, "within" the effect container) are displayed/played.

In some embodiments, a keyframe 3015 (which may, for example, be one dimensional (1D) 3016, two dimensional (2D) 3017 or a vector (3018)), may be used by an animation path 3014 to guide or instruct the rate at which animation path 3014 should operate. Meaning, the higher the value of a keyframe 3015, the increased rate the animation path 3014 may operate (e.g., a faster pan-zoom effect or a faster layer rotation), and the lower the value of a keyframe 3015, the lower rate the animation path 3014 may operate at (e.g., a slower pan-zoom effect or a slower layer rotation). A 1D 3016 keyframe may be a keyframe that animates a property that has one value like, for example, a rotation angle. A 2D 3017 keyframe may be a keyframe that animates a property that has more than one value like, for example, a position (x-axis point, y-axis point) or a size (width/length, height). And, a vector 3018 keyframe may be a keyframe that animates a property that has more than two values like, for example, colors that manipulate the different values of their constituent color components (e.g., red, green, blue, alpha).

In some embodiments, filters 3019 operate as visual elements that are applied to a layer, effect container, effect, or slide. A filter 3019 may be, for example, a shadow, blurred image, or some other compatible visual element capable of being applied to a layer, effect container, effect, or slide (e.g., steps 6002, 7002).

In some embodiments, a playlist 3008 associated with a document 1001 may contain a list of songs (e.g., steps 6002, 7002). The playlist 3008 may organize songs such that they are played in a specific order, determined manually by a user of the exemplary application 1000, or automatically through the exemplary application 1000. An automatic playlist may be created according to song genre, file characteristics (e.g., type, size, date, etc.), or according to the feature for dynamically profiling a slideshow soundtrack based on various criteria like beats per minute (BPM), rhythmic strength (RS), harmonic complexity (HC), and/or root mean square density (RMS or RMS strength). The songs (e.g., a reference to a playlist) may be stored in digital format in local storage 4006 or on an auxiliary device/component 4005 that communicates with the system 4000 through a communications protocol or standard. The songs may be stored in a single file (or, other logical/physical data aggregator) or many files. In addition to songs, a playlist 3008 may contain other compatible media content like videos with audio content (which, for example, may be parsed from the video file into an individual song/ audio file, or playlist). To associate a playlist, song/audio file, or any compatible media content with a document 1001, the user may select it/them from the select media content 1008 menu and drag the respective playlist, song/audio file, or other compatible media content, via the exemplary application 1000, into the effect containers region 1003 (see, for example, the reference to "Drag Audio Here" in the exemplary application 1000) (e.g., steps 6002, 7002). Songs may be played in the background while a document is being displayed/played, or they may, alternatively, be associated with foreground layers or effects that may be organized on top of another, thus, enabling the songs to be switched in coordination with the various switching (e.g., via gaps or transitions) from one layer or effect to another (e.g., steps 6004, 7004). Further, songs may, according to a default setting, start and stop playing based on the start and stop times that may be given from a media player or media management application. The user of the exemplary application 1000 may, however, define a custom start or stop time via a song (or, playlist) menu option of the application 1000.

Figure 2:
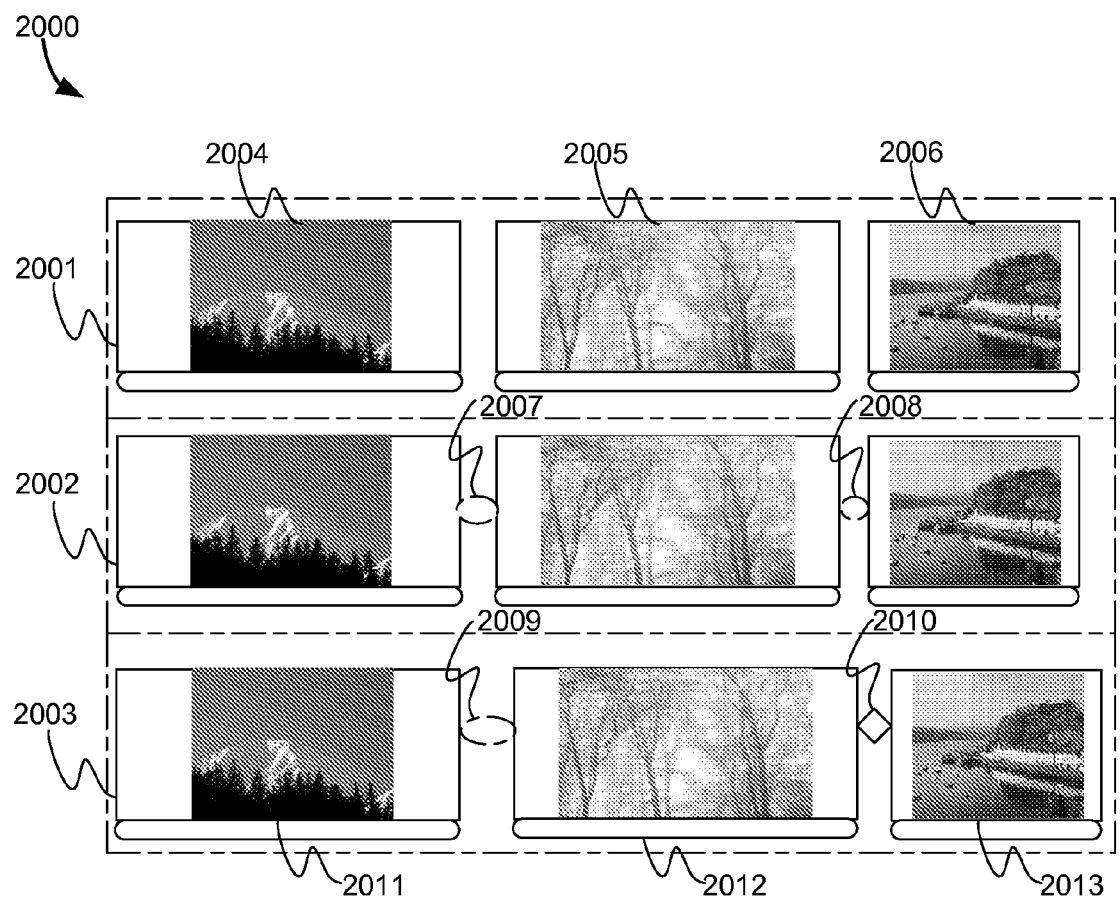
FIG. 2 illustrates features of an exemplary embodiment in accordance with the present invention.

FIG. 2 illustrates features of an exemplary embodiment in accordance with the present invention. As illustrated, the exemplary embodiment of an add effects container region 2000 (similar to that of 1003; FIG. 1) contains three layers, the first is a background layer 2001, and the second and third are foreground layers 2002 and 2003 (e.g., steps 6001, 7001, 6002, 7002, 7008, 7009). Effect containers are illustrated as 2004, 2005, and 2006 in the background layer 2001. The foreground layers 2002 and 2003 also contain effect containers. Each effect container has effects with slides/media content within, such as illustrated by the slides (e.g., images) 2011 and 2013 in the second foreground layer 2003. Moreover, gaps 2007, 2008, 2009 separate effect containers in foreground layers 2002 and 2003. Also, transition 2010 separates (or, "link") effect containers in the foreground layer 2003. Further, an effects style 2012 is illustrated for the second effect container of the second foreground layer 2003 (e.g., step 7007). The effects style may display one or more styles or properties such as, for example, a media presentation order, a thumbnail, a layout, a position, a size, a zPosition (e.g., the position in a three-dimensional (x, y, z) orientation), a base period, an effect presets, an effect settings overwrite, a matching layer duration, a recommended effect duration, a transition preset, a transition settings overwrite, a recommended transition duration, a filter preset, a filter preset criteria, a filter likelihood, a gap likelihood, a layer importance, a slide filter preset criteria, a slide frames criteria, an automatic filter likelihood, and a support per-slide customization (e.g., step 7014). Other styles or properties may also be displayed at 2012 or in another section of the graphical user interface of the exemplary application 1000 or at the container region 2000 like, for example, a background color and an automatic filter mode (e.g., step 7015). The styles or properties may apply to the effects, effect containers, layers, and/ or document, and may further be customized for each of the foregoing or inherited from each other, whether set by default or is customized (e.g., step 7007).

Figure 2A:
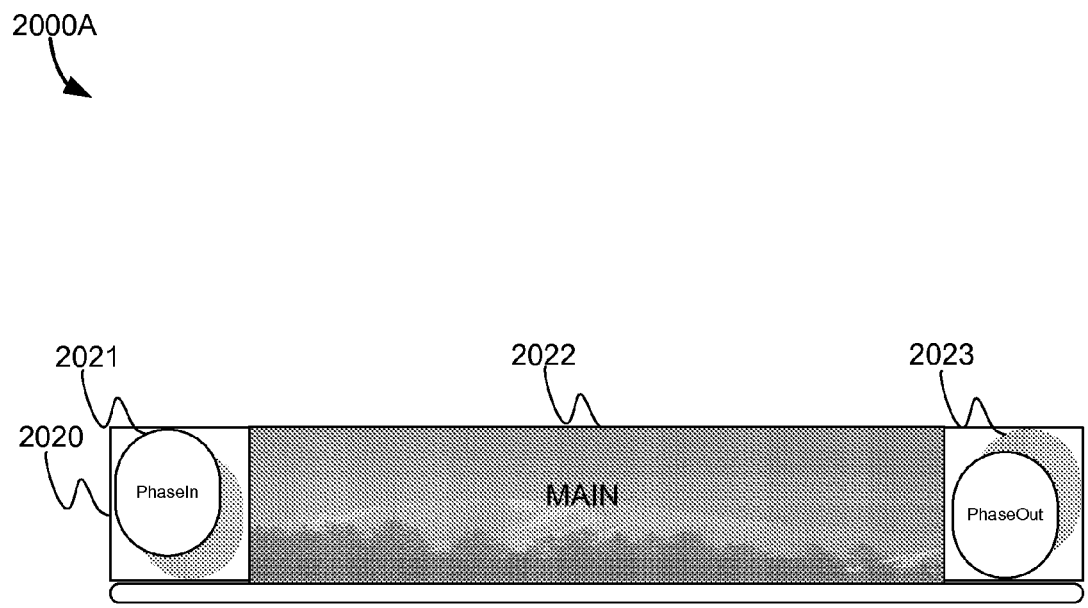
FIG. 2A illustrates features of an exemplary embodiment in accordance with the present invention.

FIG. 2A illustrates features of an exemplary embodiment in accordance with the present invention. The exemplary embodiment 2000A illustrates an effect container 2020 with a phaseIn effect 2021, a main effect 2022, and a phaseOut effect 2023. Also, the blurred image (or, movie or other media content) shown behind the "main" text illustrates an exemplary instance of a blurred effect during the main effect 2022 phase of the effect container 2020. The phaseIn effect 2021 (e.g., like a fade-in) may be used, for example, to build a single/multi-slide layout, where as the phaseOut effect 2023 (e.g., like a fade-out) may be used, for example, to tear down/ away or remove a single/multi-slide layout. Thus, the phaseIn 2021, main 2022, and phaseOut 2023 effects may be applied to a single slide or to multiple slides. Furthermore, there may be a time associated with each phaseIn effect 2021, main effect 20222, and phaseOut effect 2023. The time spent on each slide of a multi-slide effect may be equally divided among the individual slides (e.g., total effect time divided by the total number of slide, and adjusted accordingly) or apportioned in a custom manner to each individual slide.

Figure 3:
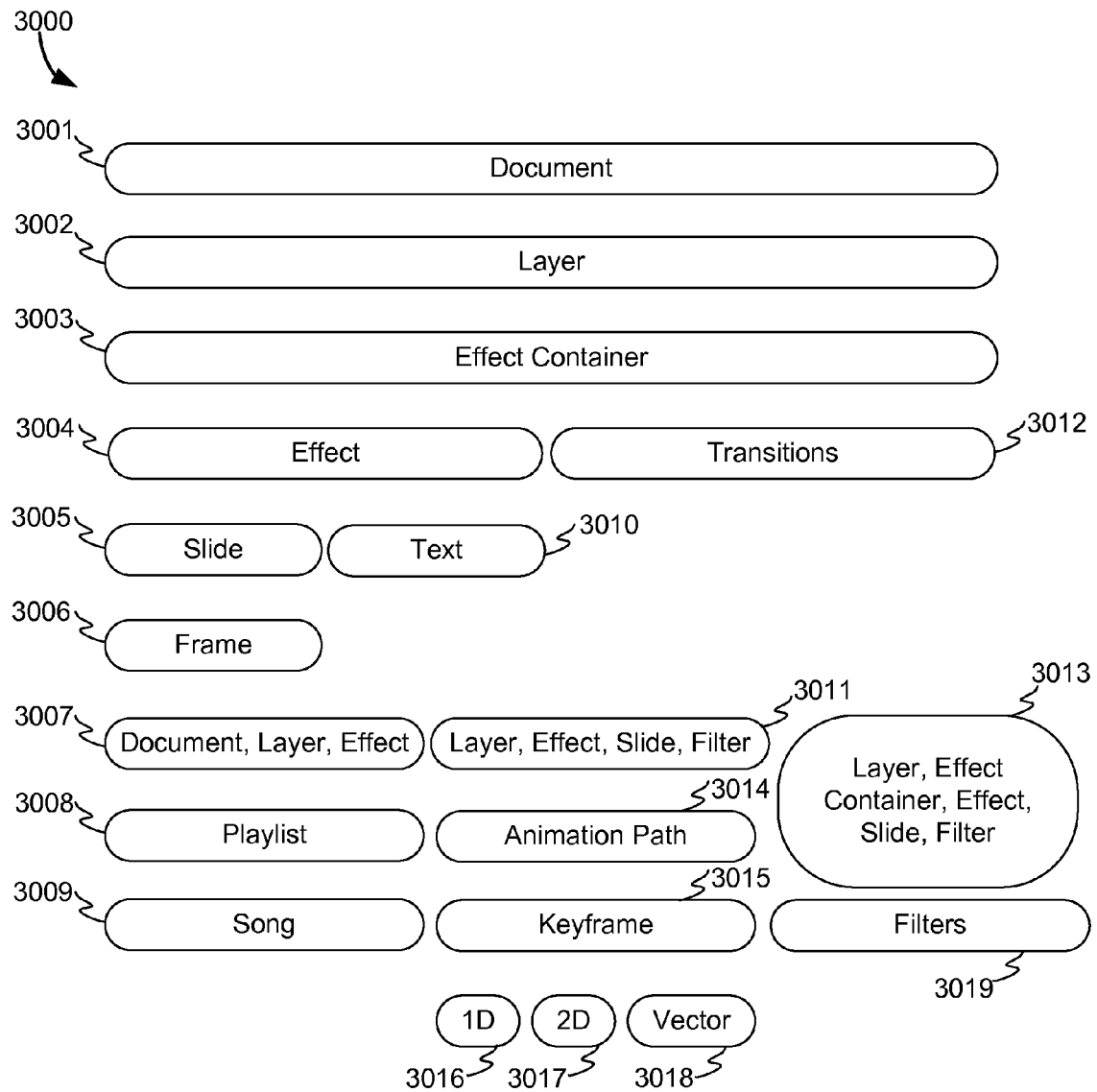
FIG. 3 is a block diagram illustrating application features of an exemplary embodiment in accordance with the present invention.

FIG. 3 is a block diagram illustrating framework features of an exemplary embodiment in accordance with the present invention. In some embodiments, the exemplary application 1000 executing on the exemplary system 4000 may cause the CPU 4001 to execute instructions for creating an electronic structure (e.g., 3000) for storage in memory 4002, local storage 4006, or on an auxiliary device/component 4005, such instructions may comprise: creating a document (e.g., 3001); associating one or more layers (e.g., 3002) to the document, wherein the layers (e.g., 3002) are organized within the document (e.g., 3002); associating one or more effect containers (e.g., 3003) with the layers, wherein the effect containers (e.g., 3003) are linked and are organized within the layers (e.g., 3003); associating one or more effects (e.g., 3004) with the effect containers (e.g., 3004); and assembling the effects (e.g., 3004), effect containers (e.g., 3003), and layers (e.g., 3002) logically within the document. The application features 3000-3019 are referred to and described in detail herein, and in view of the exemplary application 1000, which may be executed, for example, on the exemplary system 4000.

Figure 3A:
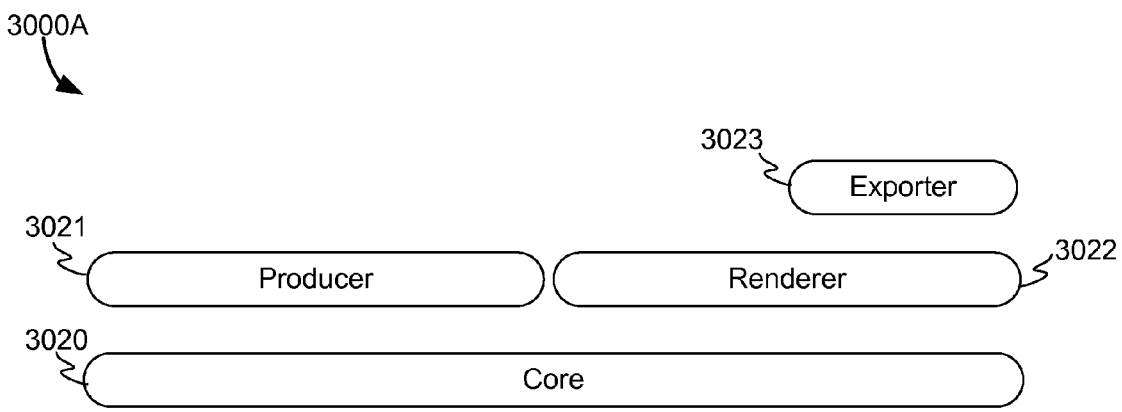
FIG. 3A is a block diagram illustrating framework features of an exemplary embodiment of in accordance with the present invention.

FIG. 3A is a block diagram illustrating framework features of an exemplary embodiment in accordance with the present invention. The framework features 3000A may comprise framework module units (or, modules) such as, for example, a core 3020, a producer 3021, a renderer 3022, and an exporter 3023. The features 3000A may implement the structure/architecture of the exemplary application 1000, and may be executed, for example, using a system like that illustrated in FIGS. 4-5.

In some embodiments, the core 3020 module may be considered the low-level data structure module and it may, for example, perform routines for representing how a slideshow/media presentation document is constructed, and contain the necessary information for accurately representing a slideshow/media presentation document according to features, many of which are described herein (e.g., steps 6001-6003, 7001-7003). Some of those features may include, for example, features related to timing (e.g., gaps 1013, transitions 1014), positioning (e.g., background layer 1004, foreground layer 1005, effects of effect containers 2004-2006, slides 2011, filters 3019, text 3010), sizing (e.g., keyframe 3015, animation path 3014, as well as their interaction), and files (e.g., songs 3008, playlists 3009).

In some embodiments, the producer 3021 may be considered the module for creating how a slideshow will look and feel (e.g., steps 6002-6003, 7002-7003), performing several analyses related to media content (e.g., images, audio, video of layers, effect containers, effects, and slides) (e.g., step 7016), and automatically assembling slideshows/media presentations according to data that may result from the analyses (e.g., steps 6004, 7004, 7011). The several analyses (e.g., step 7016) may include analysis of characteristics related to layers, effect containers, effects, and slides. Such characteristics may include, for example, layer type (e.g., background 1004, foreground 1005), layer number (e.g., position in relation to the background-most layer 1004), number of effect containers, length of gaps 1013 and transitions 1014, type of transitions 1014, type of effects, number of effects, number of slides, type of slides, document length 1004, user preferences (e.g., for ordering layers, effect containers, effects, slides), audio analyses, video analyses, or other similar characteristics. After performing the several analyses using, for example, the producer 3021, the resulting data from the several analyses may be processed by the producer 3021, the core 3020, the renderer 3022, the exporter 3023, or other module (e.g., step 7017). The producer 3021 may, for example, interface with and utilize the application programming interfaces (API) of frameworks like, for example, browsers or QuickTime® to gather such information as thumbnail data and resolutions for images, as well as audio or video durations or other characteristics. The gathered information may then be processed by the producer 3021 in accordance with one or more general/specific algorithms (or, other analytical methods) and then used by the producer 3021 (or, other module with which the producer 3021 may call), for example, to automatically assemble a slideshow or media presentation document (e.g., 7011). The producer 3021 may further, for example, assemble a document via core 3020 for play/display using the features of renderer 3022, by accessing photos and coupling such photos with a style (e.g., 1015). In addition, the producer 3021 may also, for example, perform audio analysis functions on songs 3009 or a set of songs (playlist 3008) using such analysis like, for example, beat detection/mapping as described below. The producer 3021 may also keep track of available styles (e.g., 1015), effects 3004, transitions 3012, and frames 3006.

In some embodiments, the renderer 3022 may be considered the play/display module. The renderer 3022 may receive slideshow/media presentation data from, for example, the core 3020 and producer 3021 and may render such data such that it may be sent to a graphics card or other display device (or interface) (e.g., 4003). The renderer 3022 may interface with QuickTime® media player (e.g., the framework of QuickTime® media player) or another compatible application (or, framework) for audio/video decoding. In addition, the renderer 3022 may also interface with a composer-type application for actual rendering (e.g., of the slides), and the same or another similar application for applying filters 3006.

In some embodiments, the exporter 3023 may be considered the sharing module. The exporter 3023 may, for example, use renderer 3022 to export the slideshow/media presentation document to different formats (e.g., file formats) like those supported by QuickTime® or other similar applications. The exporter 3023 may, for example, obtain movie frame-type data from renderer 3022 and add it to a movie-type file. When the exporter 3023 is finished retrieving data for each movie, the slideshow/media presentation document would be available for access and sharing through the exemplary application 1000 or other applications that may access or handle the document in its final format.

Figure 4:
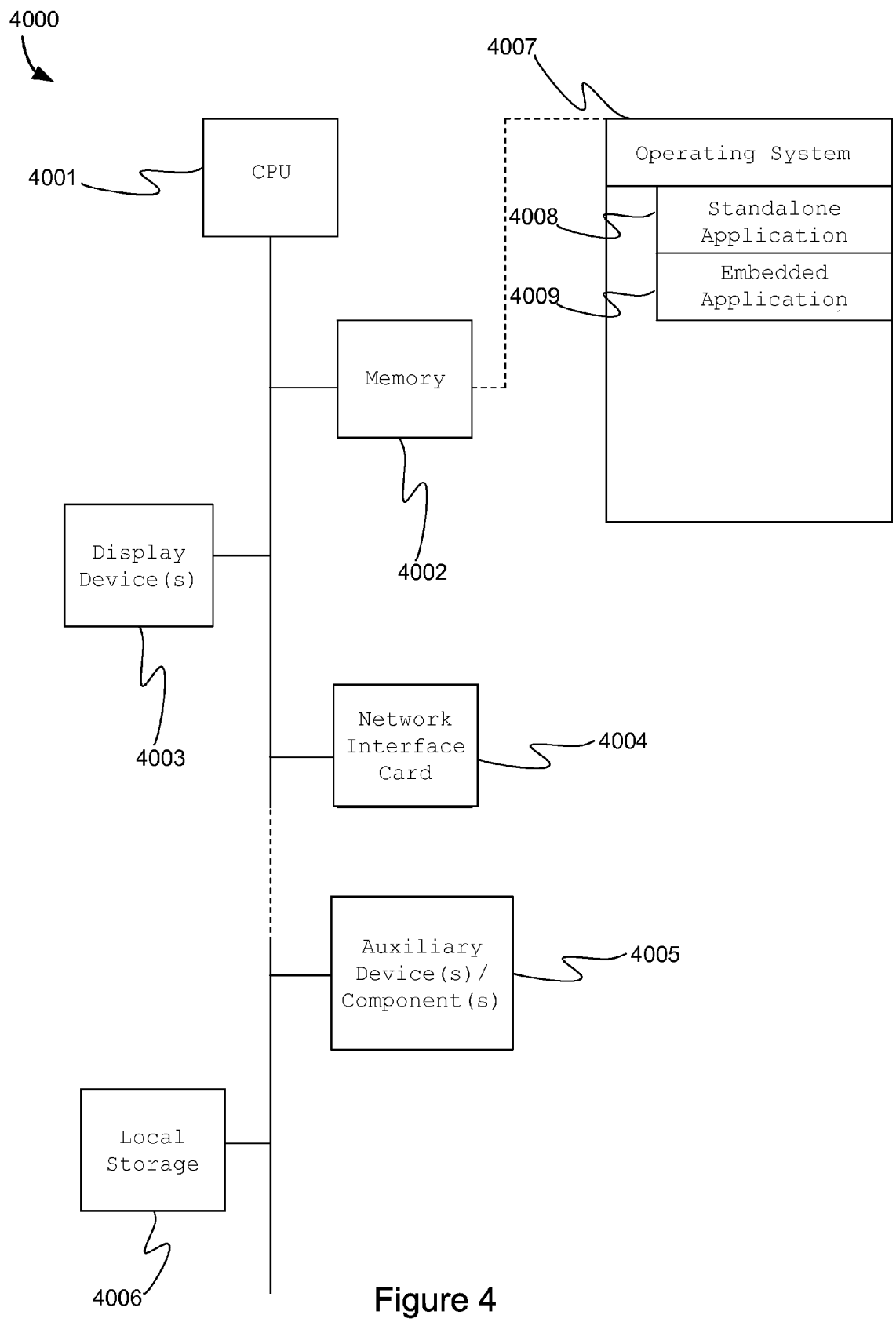
FIG. 4 illustrates an exemplary system implementing an application in accordance with the present invention.

FIG. 4 illustrates an exemplary system implementing an application in accordance with the present invention. The exemplary system 4000, described above, may implement the exemplary application 1000. Other modules and other routine programming-related matters may not be shown in FIG. 4, but would be understood and may be implemented by one of ordinary skill in the art without departing from the scope of the present invention.

Figure 5:
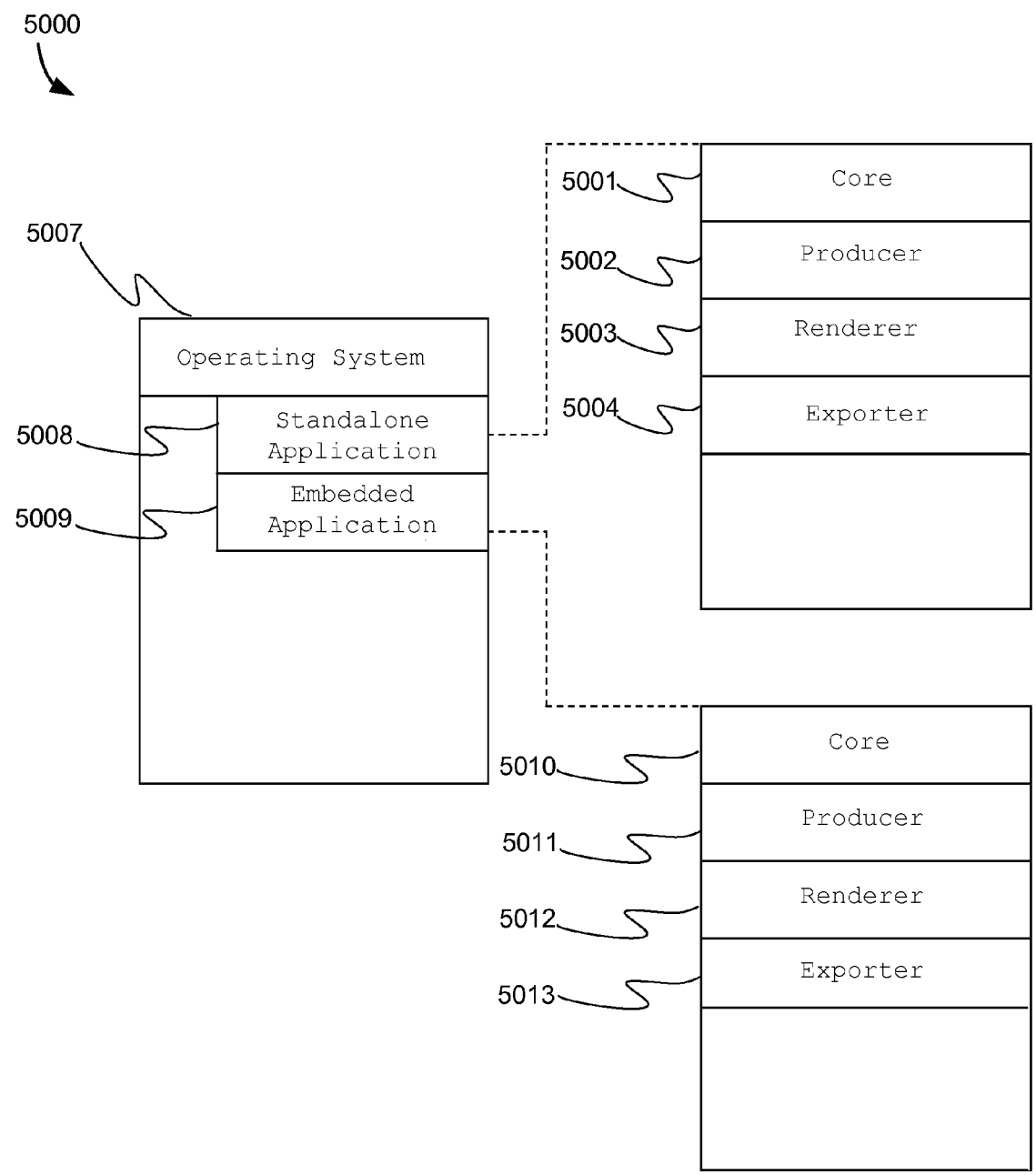
FIG. 5 illustrates an exemplary implementation of an application in accordance with the present invention.

FIG. 5 illustrates an exemplary implementation of an application in accordance with the present invention. The module units 5001-5004 and 5010-5013 of the exemplary implementation of an application 5000 are described more fully above for FIG. 3A. The module units 5001-5004 and 5010-5013 may be implemented, for example, by a standalone 4008, 5008 or an embedded 4009, 5009 application, respectively. Further, an exemplary system such as that illustrated in FIG. 4 may execute the standalone 4008, 5008 or embedded 4009, 5009 applications. Other compatible or similar systems may also execute the applications 4008, 5008 and 4009, 5009 without departing from the scope of the present invention.

Figure 6:
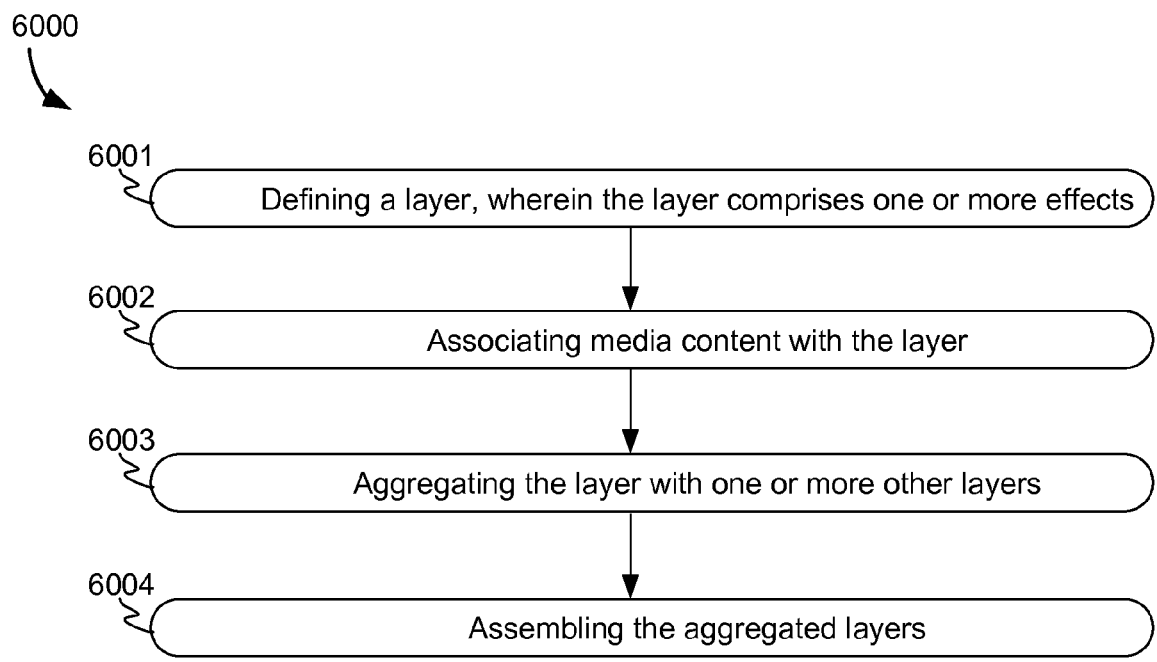
FIG. 6 illustrates an exemplary method in accordance with the present invention.

FIG. 6 illustrates an exemplary method in accordance with the present invention. The exemplary method 6000 comprises the following computer-implemented steps: defining a layer, wherein the layer comprises one or more effects 6001; associating media content with the layer 6002; aggregating the layer with one or more other layers 6003; and assembling the aggregated layer 6004. The exemplary method 6000 and, further, steps 6001-6004 may be implemented using an exemplary system such as that embodied in FIG. 4, which may execute the exemplary application 1000, and as described herein.

Figure 7:
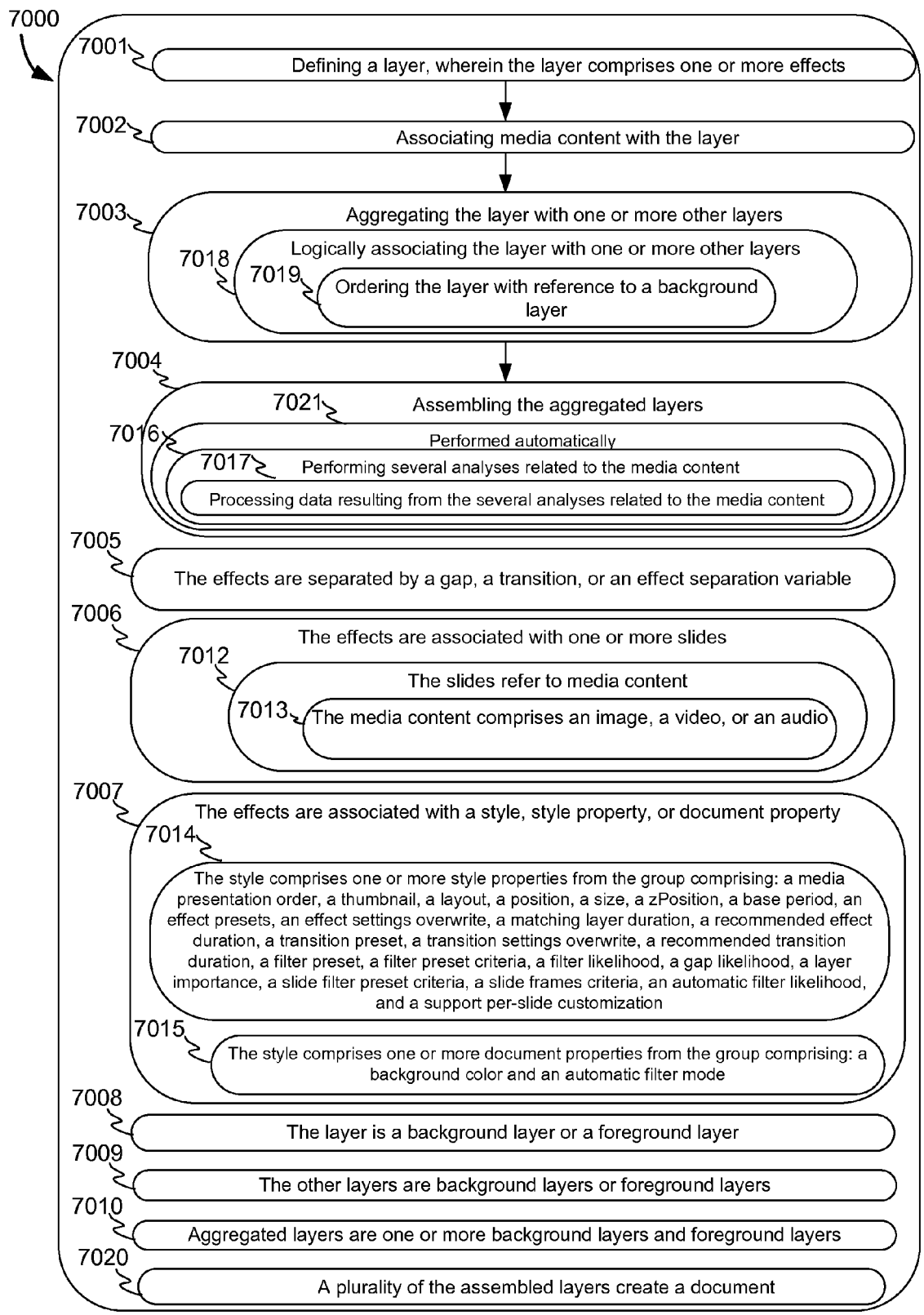
FIG. 7 illustrates an exemplary method in accordance with the present invention.

FIG. 7 illustrates an exemplary method in accordance with the present invention. The exemplary method 7000 comprises the computer-implemented steps of the exemplary method 6000 with the addition of steps 7005-7015. The exemplary method 7000 and, further, steps 7001-7015 may be implemented using an exemplary system such as that embodied in FIG. 4, which may execute the exemplary application 1000, and as described herein.

Figure 8:
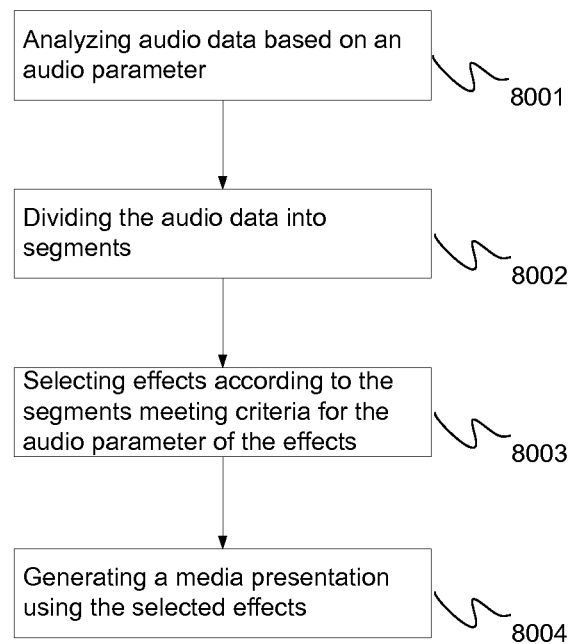
FIG. 8 illustrates an exemplary method in accordance with the present invention.

FIG. 8 illustrates an exemplary method in accordance with the present invention. The method is designed to dynamically profile audio data, such as a song, playlist, or slideshow soundtrack, based on various audio parameters and to author the media presentation using the profiled audio data. As described more fully with respect to FIGS. 1 and 3A, a user may select a song/audio file or playlist via the select media content 1008 menu and drag the song/audio file or playlist into the effects containers region 1003 (see, for example, the reference to "Drag Audio Here") of exemplary application 1000.

Figure 9:
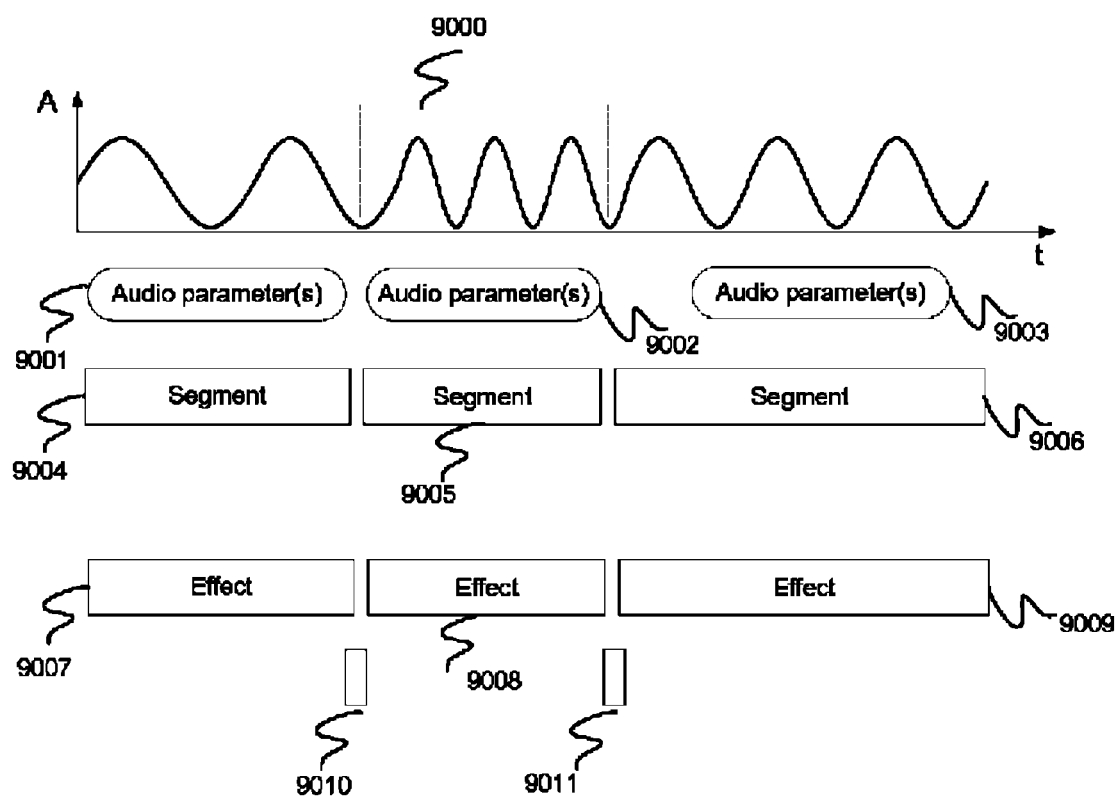
FIG. 9 illustrates an exemplary diagram in accordance with the present invention.

FIG. 9 illustrates an exemplary diagram in accordance with the present invention. Each song/audio file, piece of music, or playlist has different properties (e.g., pitch, frequency, beats, etc.) over the duration of the song or songs. For example, as shown in graph 9000 of FIG. 9, the frequency of the song(s) changes over time.

At step 8001, the song/audio file or playlist (i.e., audio data) is analyzed based on various audio parameters. Producer 3021 may perform the analysis on the song/audio file or playlist in the effects container region 1003 of exemplary application 1000. Alternatively, producer 3021 may analyze all of the songs/audio files stored in local storage 4006 or auxiliary device/component 4005.

In some embodiments, producer 3021 performs beat mapping to analyze the song/audio file or playlist. Beat mapping is a process for accurately finding the beats of music, including at the beginning of a song, after song breaks, or when the pace of the music changes. Beat mapping may also include beat pattern recognition (e.g., first beats of bars, drum breaks, etc.). It allows mapping of effects 1011 (or 3004), transitions 1014 (or 3012), or filters 3019 to the beat and the flow of the music. For example, when effects play for four beats (or one bar), beat mapping allows the effects, filters, or transitions to be synced to the real bars of the music.

An example of a beat mapping algorithm is provided. It will be apparent to those skilled in the art that various modifications may be made to the beat mapping algorithm. The beat mapping algorithm has two phases: 1) beat detection and 2) analysis of the beats. During the beat detection phase, the audio files/songs are analyzed to determine features that indicate the pace of the music. The features of pace may include the beats, which is a strong change in sound energy (e.g., base drum or snare drums) or a change in notes of the music. The second phase is analysis of the beats to find the patterns of the music and to infer the full beat of the music. In some embodiments, analysis of the sound signal is performed on frequency bands. Analysis using frequency bands allows a first instrument, such as a bass drum, to be separated from voices or other instruments, such as snare drums.

The beat detection phase may include Fourier analysis. For example, the analysis may include computing Fast Fourier Transforms (FFTs) of the sound signal on windows approximately 1/40 second wide at about eighty (80) windows per second. Each window may overlap. Before performing the FFTs, Hamming windows may be applied to minimize the edge effects on the FFTs. In this example, 80 FFTs per second result, which are then separated into bands (e.g., 8 or 16). For each band and each window, the energy, energy history, and the relative energy delta may be computed. Energy history may represent the sum of the energies a time interval before the window. The relative delta may represent the energy delta with the previous window with respect to the energy history. In this example, a large energy delta in a quiet part of a song is more important than an equally large energy delta in a loud part. Beats of music may be detected using the relative energy. The beats are a time when the relative energy delta is greater than a defined number. For example, this occurs when there is a loud boom in a piece of music. The defined number determines how sensitive the beat detection is. The defined number may be deduced from the music using energy variance or may be held constant.

In some embodiments, the analysis of the beats phase may include finding patterns in the detected beats, removing extra beats, and/or handling missing beats. Various techniques may be used to analyze the beats including a phase-locked loop with gradient method, multi-agent systems, comb filters, or particle systems. It will be apparent to those skilled in the art that various modifications and variations can be made to the types of processes used for analyzing beats.

An example of the analysis of the beats phase may include analysis using a type of auto-convolution and then using a type of comb filter algorithm. The type of auto-convolution may include generating intervals between the beats that are close to each other. The length of the intervals is then compared using a modified greatest common denominator (GCD) to find a close common denominator between them. For example, if two intervals are of length forty nine (49) and sixty three (63), the modified GCD will find that sixteen (16) is a close common denominator to them. A common denominator found often generally has a greater chance to be related to the local period of the beat. This type of auto-convolution analysis allows intervals to be related, and thus it may be statistically possible to find the number of beats per bar. The number of beats per bar is typically four (4), however it can be three (3) or (5). In addition, the auto-convolution analysis allows for identifying which beat period is associated with which beat. This may be used to build beat sets (i.e., beats that are related to each other using the given beat period) and then to find patterns or music phrases. Because the beat periods may be approximations due to the imprecision of mathematical processes, such as the sampling rate, the FFT window, beat detection, etc., the same interval may have a period that varies by two samples. Thus, a phase to consolidate the periods may be used. For example, if the periods are 123 and 124, they may become the same period. The cardinal of the sets of beats that are related to each period may then be taken. The likely period of the mean beat may then be deduced. Because of the consolidation phase, which allows for an identification of related beat sets, an identification of several distinct phases of beats with different beat periods may be made.

The comb filter analysis may include taking a comb function that is equal to one (1) where a beat was detected (A) and zero (0) where not (A) and convolving it with a function that is mainly zero and has triangular spikes around potential beats given a beat period and a number of beats (B(p,n)). The detected beats (A) may be analyzed as follows:

..|...|.....|...|...|...|........|...|...| the potential beats (B(p,n)):
^ ... ^ ... ^ ... ^ ... ^ ... ^ p=4, n=6.

The convolution gives a score of how the tried period p matches the detected beats in the signal. For example, the narrower the triangles, the more the match must be precise. This calculation is done for each beat. The period may be adapted to find the best match around the current period. The match may be done with two beats first and if the score is good (approximately equal to two (2)), then the beat is taken and the matching analysis may move to the next beat. If the beat is not good, then the match is attempted with four (4), eight (8), sixteen (16), and thirty two (32) beats. The amount by which the period may be adapted may depend on the number of potential beats that are being tested. For example, for two (2) or four (4) beats, the period may hardly change. For thirty two (32) beats, the period may change more. Thus, if there is a good match for the next potential thirty (32) beats, even if there is a large change in period, the analysis may be more correct. However, if the analysis is only done for two (2) or four (4) beats, then the analysis may focus on whatever extra beat exists. The comb filter algorithm described above may be performed forward and backward from a reference beat. The reference beat may be chosen using criteria meant to ensure that it is the main beat of the music. The main beat may be the biggest beat set and the comb filter algorithm may sufficiently extend from it both backwards and forwards.

In some embodiments, beat mapping, including beat detection and analysis of the beats, is used to determine values for an audio parameter or audio parameters of a song. For example, for each song, producer 3021 analyzes the song using beat mapping to determine values for audio parameters 9001-9003 as shown in FIG. 9. The audio parameters 9001-9003 may include beats per minute (BPM), rhythmic strength (RS), harmonic complexity (HC), and/or square root of the arithmetic mean of the square of density variations (RMS strength). Other parameters may also be used. BPM may refer to the basic pace of a piece of music. Typically, the BPM for a song is not a constant value through the duration of the song. Rather the BPM adjusts dynamically throughout the song. The RS of a piece of music may characterize the rhythm of the piece of music. For example, a drum in a techno song may receive a high score, while a flute in a classical piece of music may receive a low score. In this example, the RS may be different between two pieces of music even though the pace of each of the pieces is the same. The HC of a song may represent how many instruments or musical parts are playing at the same time. HC is used to identify and differentiate different parts of a song. For example, HC may be used to identify and differentiate between the introduction, the waiting period (i.e., with few parts), and the main melodies (i.e., where the full range of instruments may be deployed) of a song. The RMS strength (i.e., square root of the arithmetic mean of the square of density variations) of a song is used to distinguish between the loud parts and the more peaceful of a song. The RMS strength may be based on the actual volume of the song and is used as a relative measure.

At step 8002 shown in FIG. 8, the song/audio file or playlist is divided into segments. Step 8002 may be performed by producer 3021. A segment may be defined as a period of time in the song/audio file or playlist where the audio parameter(s) 9001-9003 is in a range of values. The range of values may be user-defined or automatically defined by system 4000. Producer 3021 may divide the song/file or playlist into chunks based on values of the parameters. If the audio parameters fall within a particular range of values, then producer 3021 may create a segment or segments. For example, as shown in FIG. 9, segments 9004-9006 each have a different range of values for audio parameter(s) 9001-9003. In some embodiments, system 4000 uses the segments 9004-9006 of songs/audio files or playlists and associated audio parameter(s) 9001-9003 in the authoring or generation of slideshow/media presentations. More specifically, producer 3021 may apply the segments 9004-9006 of songs/audio files or playlists and associated audio parameter(s) 9001-9003 to effects 9007-9009 (also, FIG. 1, reference numeral 1011 and FIG. 3, reference numeral 3004). Producer 3021 may also apply this information to transitions 1014 (also, FIG. 3, reference numeral 3012), or filters 3019.

At step 8003, effects 1011 (also, FIG. 3, reference numeral 3004 and FIG. 9, reference numerals 9007-9009) are selected. The processes for selecting effects may apply to transitions 1014 (also, FIG. 3, reference numeral 3012), or filters 3019. Producer 3021 may select the effects. For example, producer 3021 may select effects according to whether the segments 9004-9006 meet an acceptance range(s) (or criteria) for audio parameter(s) of the effects 1011. If the segment meets the acceptance range(s) (or criteria) for the audio parameter(s) of the effect, the effect is included in a list of possible effects for authoring a media presentation/slideshow. If the segment does not meet the acceptance range(s) (or criteria) for the audio parameter(s) of the effect, the effect is excluded in the list of possible effects for authoring a media presentation/slideshow.

In some embodiments, the selection of effects may include additional steps. These steps may be performed by producer 3021. For example, producer 3021 may associate each of the segments 9004-9006 with a segment profile. The segment profile may include the defined range of the audio parameter(s) for each segment. Producer 3021 may define an audio requirements profile for each of the effects. The audio requirements profile may include the acceptance range(s) or criteria for the audio parameter(s). A style of an effect may also have acceptance range(s). Producer 3021 may compare the segment profile for each of the segments to the audio requirements profile for each effect. Producer 3021 may determine whether the segment profile for each of the segments meets the criteria for the audio parameter in the audio requirements profile. If the segment meets the acceptance range(s) (or criteria) for the audio parameter(s) of the effect, the effect is included in the list of possible effects for authoring a media presentation/slideshow. If the segment does not meet the acceptance range(s) (or criteria) for the audio parameter(s) of the effect, the effect is excluded in the list of possible effects for authoring a media presentation/slideshow.

In some embodiments, a user may select or filter (i.e., include or exclude) effects 1011 (also, FIG. 3, reference numeral 3004 and FIG. 9, reference numerals 9007-9009) using application 1000. A user may drag the audio file/song into the add effect containers region 1003 (see, for example, the reference to "Drag Audio Here" in the exemplary application 1000). Producer 3021 may automatically filter or select the effects as described above. The selected or filtered effects may be displayed in the main effects library 1011 or in the edit layers and add effect containers region 1003 by producer 3021.

At step 8004, a media presentation is authored or generated using the selected or filtered effects. The selected or filtered effects may be synchronized with the audio files/songs. Producer 3021 along with core 3020 and renderer 3022 may automatically assemble the selected or filtered effects with the audio files/songs in the effects containers region 1003. Producer 3021 may automatically rearrange or assemble the selected or filtered effects to be synchronized with the audio files/songs.

Figure 10:
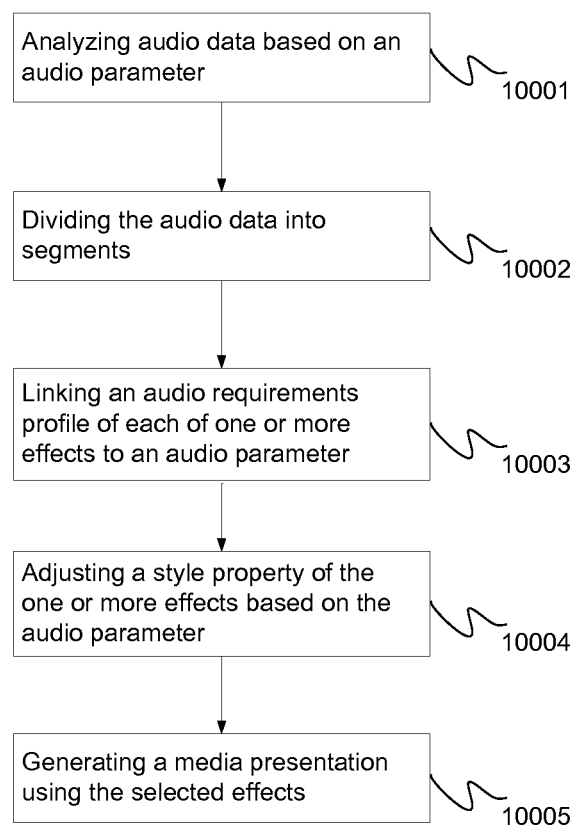
FIG. 10 illustrates another exemplary method in accordance with the present invention.

FIG. 10 illustrates an exemplary method in accordance with the present invention. The method comprises the computer-implemented steps 10001 and 10002. These steps were described above as steps 8001 and 8002. The method of FIG. 10 further includes additional steps 10003 through 10005. At step 10003, the audio requirements profile of the effects as described above is linked to the audio parameter(s) 9001-9003, such as BPM, RS, HC, and RMS strength. Producer 3021 may perform step 10003.

At step 10004, the effects may be adjusted based on the linked audio parameters 9001-9003. The effect style 1015 may also be adjusted. For example, the transition duration 9010 or 9011, effect duration, the in point of an effect (i.e., the time the effect begins), and out point of the effects (i.e., the time the effect ends) may be adjusted. For example, transition durations 9010 or 9011 may be adjusted to be shorter for a higher BPM. The transition durations 9010 or 9011 may be lengthened for a longer BPM.

At step 10005, a media presentation is authored or generated using the adjusted effects. Because the effects are adjusted based on the audio parameters 9001-9003, they may be synchronized with the audio files/songs. For example, producer 3021 along with core 3020 and renderer 3022 may automatically assemble the adjusted effects 1011 (also, FIG. 3, reference numeral 3004 and FIG. 9, reference numerals 9007-9009) with the audio file/song in the effects containers region 1003. Producer 3021 may automatically rearrange or assemble the adjusted effects to be synchronized with the audio files/songs. In some embodiments, the method shown in FIG. 8 can be used in conjunction with the method shown in FIG. 10.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A computer-implemented method for generating a multi-media presentation, comprising:
   analyzing audio data based on an audio parameter;
   dividing the audio data into a plurality of segments based at least in part on the audio parameter falling in a defined range for all audio data included in each segment of the plurality of segments, each segment having a segment profile including the defined range for the audio parameter;
   accessing a plurality of effects to include in the multi-media presentation, each effect of the plurality of effects including an audio requirement profile;
   comparing the audio parameter in the segment profile for each segment of the plurality of segments to the audio requirement profile for each effect of the plurality of effects;
   generating, in response to comparing the audio parameter, a list of selectable effects based at least in part on the audio parameter meeting an acceptance criteria associated with the audio requirement profile; and
   generating the multi-media presentation using the list of selectable effects.

2. The computer-implemented method of claim 1, wherein the audio parameter is selected from the group comprising: beats per minute, rhythmic strength, harmonic complexity, and square root of the arithmetic mean of the square of density variations (RMS) strength.

3. The computer-implemented method of claim 1, wherein the dividing step is based on a range of the audio parameter.

4. The computer-implemented method of claim 1, wherein the acceptance criteria is an acceptance range.

5. A computer-implemented method for generating a multi-media presentation, comprising:
   analyzing audio data based on an audio parameter;
   dividing the audio data into a plurality of segments based at least in part on the audio parameter falling in a defined range for audio data included in each segment of the plurality of segments, each segment having a segment profile including the defined range for the audio parameter;
   linking an audio requirements profile of each of one or more effects to the audio parameter;
   adjusting the one or more effects based on the audio parameter;
   comparing the audio parameter in the segment profile for each segment of the plurality of segments to the audio requirement profile for each effect of the plurality of effects;
   generating, in response to comparing the audio parameter, a list of selectable effects based at least in part on the audio parameter meeting an acceptance criteria associated with the audio requirement profile; and
   generating a multi-media presentation using the list of selectable effects.

6. The computer-implemented method of claim 5, wherein the audio parameter is selected from the group comprising: beats per minute, rhythmic strength, harmonic complexity, and square root of the arithmetic mean of the square of density variations (RMS) strength.

7. The computer-implemented method of claim 5, wherein the dividing step is based on a range of the audio parameter.

8. The computer-implemented method of claim 5, wherein the step of adjusting further comprises adjusting one or more of the transition duration, effect duration, in points, and out points of the one or more effects.

9. A computer-implemented system for generating a multi-media presentation, comprising:
   memory configured to store audio data; and
   one or more processors configured to analyze the audio data based on an audio parameter and divide the audio data into a plurality of segments based at least in part on the audio parameter falling in a defined range for all audio data included in each segment of the plurality of segments, each segment having a segment profile including the defined range for the audio parameter,
   the one or more processors further configured to access a plurality of effects to include in the multi-media presentation, each effect of the plurality of effects including an audio requirement profile,
   the one or more processors further configured to compare the audio parameter in the segment profile for each segment of the plurality of segments to the audio requirement profile for each effect of the plurality of effects; and
   the one or more processors further configured to generate, in response to comparing the audio parameter, a list of selectable effects based at least in part on the audio parameter meeting an acceptance criteria associated with the audio requirement profile and generate a multi-media presentation using the list of selectable effects.

10. The computer-implemented system of claim 9, wherein the audio parameter is selected from the group comprising: beats per minute, rhythmic strength, harmonic complexity, and square root of the arithmetic mean of the square of density variations (RMS) strength.

11. The computer-implemented system of claim 9, wherein the dividing step is based on a range of the audio parameter.

12. The computer-implemented system of claim 9, wherein the acceptance criteria is an acceptance range.

13. A computer-implemented system for generating a multi-media presentation, comprising:
   memory configured to store audio data; and
   one or more processors configured to analyze audio data based on an audio parameter and divide the audio data into a plurality of segments based at least in part on the audio parameter falling in a defined range for all audio data included in each segment of the plurality of segments, each segment having a segment profile including the defined range for the audio parameter, the one or more processors further configured to link an audio requirements profile of each of one or more effects to the audio parameter, adjust the one or more effects based on the audio parameter, compare the audio parameter in the segment profile for each segment of the plurality of segments to the audio requirement profile for each effect of the plurality of effects, generate a list of selectable effects based at least in part on the audio parameter meeting an acceptance criteria associated with the audio requirement profile, and generate a multi-media presentation using the list of selectable effects.

14. The computer-implemented system of claim 13, wherein the audio parameter is selected from the group comprising: beats per minute, rhythmic strength, harmonic complexity, and square root of the arithmetic mean of the square of density variations (RMS) strength.

15. The computer-implemented system of claim 13, wherein the dividing step is based on a range of the audio parameter.

16. The computer-implemented system of claim 13, wherein the one or more processors is further configured to adjust one or more of the transition duration, effect duration, in points, and out points of the one or more effects.

17. A non-transitory computer-readable storage medium storing one or more programs configured for execution by a computer for generating a multi-media presentation, the one or more programs comprising instructions to:

analyzing audio data based on an audio parameter;

dividing the audio data into a plurality of segments based at least in part on the audio parameter falling in a defined range for all audio data included in each segment of the plurality of segments, each segment having a segment profile including the defined range for the audio parameter;

accessing a plurality of effects to include in the multi-media presentation, each effect of the plurality of effects including an audio requirement profile;

comparing the audio parameter in the segment profile for each segment of the plurality of segments to the audio requirement profile for each effect of the plurality of effects;

generating, in response to comparing the audio parameter, a list of selectable effects based at least in part on the audio parameter meeting an acceptance criteria associated with the audio requirement profile; and generating the multi-media presentation using the list of selectable effects.

18. A non-transitory computer-readable storage medium storing one or more programs configured for execution by a computer, the one or more programs comprising instructions to:

analyzing audio data based on an audio parameter;

dividing the audio data into a plurality of segments based at least in part on the audio parameter falling in a defined range for audio data included in each segment of the plurality of segments, each segment having a segment profile including the defined range for the audio parameter;

linking an audio requirements profile of each of one or more effects to an audio parameter;

adjusting the one or more effects based on the audio parameter;

comparing the audio parameter in the segment profile for each segment of the plurality of segments to the audio requirement profile for each effect of the plurality of effects;

generating, in response to comparing the audio parameter, a list of selectable effects based at least in part on the audio parameter meeting an acceptance criteria associated with the audio requirement profile; and generating a slideshow using the list of selectable effects.

* * * * *